US012622845B2

(12) United States Patent
Etchepare et al.

(10) Patent No.: US 12,622,845 B2
(45) Date of Patent: May 12, 2026

(54) CONTAINER MADE FROM SODA-LIME GLASS WITH IMPROVED CHEMICAL RESISTANCE FOR A PHARMACEUTICAL OR DIAGNOSTIC SUBSTANCE

(71) Applicant: SGD S.A., Paris la Defense Cédex (FR)

(72) Inventors: Pierre-Luc Etchepare, Rouen (FR); Christophe Depoilly, Aigneville (FR); Jingwei Zhang, Massy (FR)

(73) Assignee: SGD S.A., Paris la Defense Cédex (FR)

( * ) Notice: Subject to any disclaimer, the term of this patent is extended or adjusted under 35 U.S.C. 154(b) by 356 days.

(21) Appl. No.: 18/271,524

(22) PCT Filed: Dec. 22, 2021

(86) PCT No.: PCT/FR2021/052429
§ 371 (c)(1),
(2) Date: Jul. 10, 2023

(87) PCT Pub. No.: WO2022/148918
PCT Pub. Date: Jul. 14, 2022

(65) Prior Publication Data
US 2024/0058214 A1     Feb. 22, 2024

(30) Foreign Application Priority Data
Jan. 11, 2021     (FR) ...................................... 2100213

(51) Int. Cl.
*A61J 1/06* (2006.01)
*C03C 4/20* (2006.01)
*C03C 23/00* (2006.01)

(52) U.S. Cl.
CPC ................. *A61J 1/065* (2013.01); *C03C 4/20* (2013.01); *C03C 23/0075* (2013.01)

(58) Field of Classification Search
CPC ..... A61J 1/065; A61J 1/06; A61J 1/05; C03C 4/20; C03C 23/0075
(Continued)

(56) References Cited

U.S. PATENT DOCUMENTS 3,281,225 A     10/1966     Hazdra et al.
2009/0000336 A1     1/2009     Rosler
(Continued)

FOREIGN PATENT DOCUMENTS

CN     101356133 A     1/2009
CN     106477878 A     3/2017
(Continued)

OTHER PUBLICATIONS

Baker; "Glass Containers for Parenterals"; Owens-Illinois, Inc., Toledo, Ohio.
(Continued)

*Primary Examiner* — Robert J Hicks
(74) *Attorney, Agent, or Firm* — Nath, Goldberg & Meyer; Joshua B. Goldberg

(57) ABSTRACT

The invention relates to a container (1) comprising a wall (2) made of glass delimiting a cavity (3) to accommodate a substance, particularly for a pharmaceutical or diagnostic substance, the glass wall (2) having an internal face (4) situated facing the accommodating cavity (3), the container (1) being characterized in that the wall (2) is made of soda-lime glass, the internal face (4) forming a bare glass surface intended to come into direct contact with the substance, the glass wall (2) having an atomic fraction of sodium, measured by X-ray-induced photoelectron spectrometry, which is less than or equal to 4 at. % down to a depth of at least 200 nm from the surface of the inner face (4).

27 Claims, 1 Drawing Sheet

(58) Field of Classification Search
USPC ........ 215/379, 400, DIG. 6; 220/662, 62.15,
220/DIG. 11; 428/34.5, 34.4; 65/60.1,
65/DIG. 9
See application file for complete search history.

(56) References Cited

U.S. PATENT DOCUMENTS

| | | | |
|---|---|---|---|
| 2018/0312427 A1* | 11/2018 | Perrot ........................ | A61J 9/08 |
| 2019/0016629 A1* | 1/2019 | Cooper ................ | B65D 1/0207 |
| 2021/0212893 A1* | 7/2021 | Christie .................. | A61J 1/065 |
| 2023/0087680 A1* | 3/2023 | Hoff ........................ | B65B 55/24 |
| | | | 53/167 |

FOREIGN PATENT DOCUMENTS

| | | |
|---|---|---|
| JP | S5935043 A | 2/1984 |
| JP | 107179359 A | 7/1995 |

OTHER PUBLICATIONS

Persson; "Improvement of the chemical durability of soda-lime-silica glass bottles by treating with various agents"; The Swedish Institute for Silicate Research and A B Surte Glasbruk; Glass Technology vol. 3 No. 1, Feb. 1962.
"Pharmaceutical Dosage Forms"; Parenteral Medications, Third Edition; vol. 1 - Formulation and packaging Sandeep Nema & J.D. Ludwig (Pfizer, Inc.); 1984.
"Improvement of the chemical durability of soda-lime-silica glass bottles by treating with various agents"; H. R. Persson; Feb. 1962.

* cited by examiner

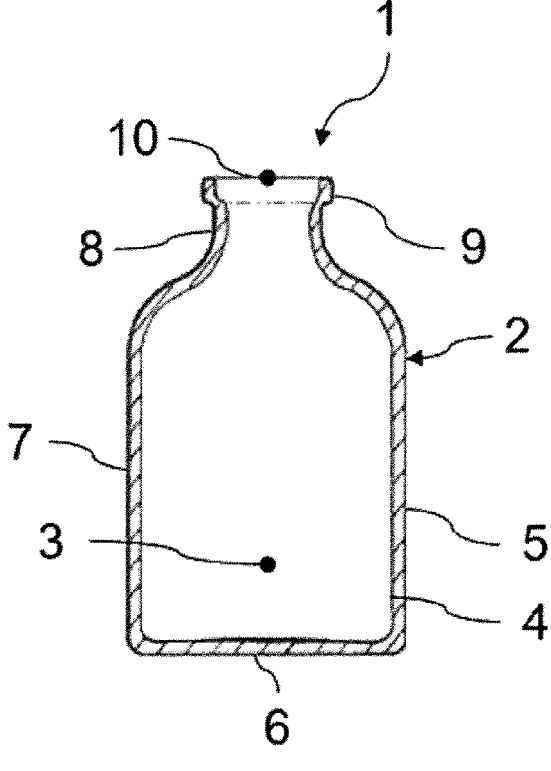

CONTAINER MADE FROM SODA-LIME GLASS WITH IMPROVED CHEMICAL RESISTANCE FOR A PHARMACEUTICAL OR DIAGNOSTIC SUBSTANCE

This is a National Phase Application filed under 35 U.S.C. 371 as a national stage of PCT/FR2021/052429, filed Dec. 22, 2021, an application claiming the benefit of French Patent Application No. 2100213, filed Jan. 11, 2021, the content of each of which is hereby incorporated by reference in its entirety.

TECHNICAL FIELD

The present invention relates to the general technical field of glass containers, in particular for the packaging of pharmaceutical or diagnostic substances.

PRIOR ART

In the field of pharmaceutical glass primary packaging, the purpose is to propose containers, in particular of the vial type, that have an excellent chemical compatibility with the product or preparation they are intended to contain. Indeed, the aim is to prevent any harmful interaction between a species from the glass forming the container and the product contained by the latter.

In this context, the pharmacopoeias identify three main different types of glass containers, which may be acceptable for a pharmaceutical use according to the nature of the considered preparation or substance. These containers are classified according to their level of chemical resistance, i.e. according to the resistance shown by the glass, of which they are formed, to the transfer of water-soluble inorganic substances in determined conditions of contact between the surface of the considered glass contain and the water. A distinction is made between the borosilicate glass containers, said of "Type I", which have intrinsically an excellent chemical resistance and which thus suit for most pharmaceutical substances and preparations, and the conventional soda-lime-silica glass containers, said of "Type III", whose chemical resistance is far less advantageous. That way, the use of these latter is limited to non-aqueous vehicle preparations for parenteral use, to the powders for parenteral use (except freeze-dried preparations) and to the preparations for non-parenteral use. A distinction is also made between so-called "Type II" glass containers, which are conventional soda-lime-silica glass containers, like the Type III ones, but whose inner face has been subjected to a specific surface treatment in order to significantly improve their hydrolytic resistance. Type II glass containers thus have an intermediate chemical resistance between those of the Type II glass containers and the Type I glass containers, which make them suitable for packaging most of the acid and neutral aqueous preparations.

Although particularly resistant on a chemical point of view, Type I glass containers are generally more complicated and expensive to produce than Type II and Type III containers, which substantially limits the use thereof. The chemical resistance of Type II glass containers, although being better than that of Type III glass containers, however remains sometimes insufficient with respect to the aggressive nature of the preparation the container is intended to contain and/or with respect to the chemical sensitivity of this preparation to certain species of the glass liable to migrate out of the latter during the preparation storage period. That is why it is sometimes contemplated to cover the inner face of the glass wall of the soda-lime glass containers with a barrier coating, for example made of pure silica $SiO_2$ or silicone-based. Nevertheless, the implementation of such a barrier coating makes the manufacturing of the containers more complex and more expensive.

DISCLOSURE OF THE INVENTION

As a result of the foregoing, the objects assigned to the present invention aim to propose a new glass wall container having an excellent chemical resistance while being relatively inexpensive to manufacture.

Another object of the invention aims to propose a new glass wall container that is moreover particularly easy to manufacture.

Another object of the invention aims to propose a new glass wall container that is safe in terms of health.

The objects assigned to the invention are achieved by means of a container comprising a glass wall delimiting an accommodation cavity for a substance, in particular for a pharmaceutical or diagnostic substance, said glass wall having an inner face located facing said accommodation cavity, said container being characterized in that said wall is made of soda-lime glass, said inner face forming a bare glass surface intended to come into direct contact with said substance, said glass wall having an atomic fraction of sodium, measured by X-ray induced photoelectron spectrometry, that is lower than 4 at. % up to a depth of at least 200 nm from the surface of the inner face.

The objects assigned to the invention are also achieved by means of a raw container intended to form such a container according to the invention, said raw container comprising a glass wall delimiting an accommodation cavity, said glass wall having an inner face located facing said accommodation cavity, said wall being made of soda-lime glass, said inner face forming a glass surface provided with sodium sulphate grains shaped and arranged in a substantially uniform manner on said surface, thus forming a substantially homogeneous translucent white bloom, said raw container being intended to undergo a washing of the surface of the glass wall inner face in order to eliminate said bloom.

BRIEF DESCRIPTION OF THE DRAWINGS

Other features and advantages of the invention will appear in more detail upon reading of the following description, with reference to the appended drawing briefly described hereinafter, given by way of purely illustrative and non-limiting example.

FIG. 1 schematically illustrates, in vertical cross-section, a preferential embodiment of a container according to the invention, wherein the container forms a vial or a bottle.

WAYS TO IMPLEMENT THE INVENTION

The invention relates to a container 1 comprising a glass wall 2 delimiting an accommodation cavity 3 for a substance (or product) intended to be packaged, stored, within the container 1. The container 1 according to the invention thus forms a primary packaging for said substance. The glass wall 2 of the container 1 has an inner face 4, located facing the accommodation cavity 3, and an opposite outer face 5. Preferably, the container 1 according to the invention forms a vial or a bottle, as in the preferential embodiment illustrated as an example in FIG. 1. The glass wall 2 of the container 1 is thus advantageously formed by a glass bottom 6, by means of which the container 1 can rest stably on a flat support, a lateral glass wall 7 that rises from the periphery of the bottom 6, and a neck 8 provided with a ring 9 that delimits an opening 10 providing access to the accommodation cavity 3 from the outside of the container 1. The container 1 thus advantageously forms a single, monolithic piece of glass. Advantageously, said opening 10 is designed so as to be able to be closed by a removable or pierceable plug or membrane seal (not illustrated). The substance that the container 1 according to the invention is intended to contain within its accommodation cavity 3 is, in particular, a pharmaceutical substance, such as for example a medication, potentially intended to be administered by parenteral route (general or locoregional) or to be ingested or absorbed by a patient, or also a diagnostic substance, as for example a chemical or biological reagent. It is preferably a liquid substance. By extension, the container 1 can be designed to contain a biological substance (or body fluid), such as for example blood, a blood product or by-product, urine, etc. Preferably, the container 1 according to the invention has a rated volume between 5 mL and 1,000 mL, which makes it particularly suitable for the packaging of pharmaceutical or diagnostic substances. Even if the application to the pharmaceutical and diagnostic fields is preferred, the invention is however not limited to pharmaceutical and diagnostic containers and may in particular also relate to a container designed to contain a liquid, pasty or powder substance for industrial (storage of chemical products, etc.), veterinary, food or also cosmetic use.

In the sense of the invention, the word "glass" refers to a mineral glass. More particularly, the wall of the container 1 is generally made in mass of soda-lime (or "soda-lime-silica") glass. The glass forming the wall 2 of the container 1 therefore advantageously comprises, on average, in mass, between 71% and 74% of silicon oxide $SiO_2$, between 10% and 12% of calcium oxide CaO, between 11% and 14% of sodium oxide $Na_2O$, between 0% and 2% of potassium oxide $K_2O$, between 0% and 3% of magnesium oxide MgO, between 0% and 1% of barium oxide BaO, and 1% and 3% of aluminium oxide $Al_2O_3$. More advantageously, the glass of the wall 2 of the container 1 comprises, on average, in mass, between 72% and 74% of silicon oxide $SiO_2$, between 10.5% and 11.5% of calcium oxide CaO, between 12% and 13% of sodium oxide $Na_2O$, between 0% and 1.5% of potassium oxide $K_2O$, between 0% and 1.5% of magnesium oxide MgO, between 0% and 1% of barium oxide BaO, and 1.5% and 2.5% of aluminium oxide $Al_2O_3$. The glass of the wall 2 may moreover contain additional elements such as zinc, iron, etc., preferably as traces.

The glass of the wall 2 of the container 1 is preferably transparent or translucent, in the visible domain for human eye. It may be indifferently either a colourless glass or a coloured glass ("yellow" or "amber" glass, for example), notably to protect substance contained in the container 1 against the effects of light, in particular in certain wavelength ranges (UV, etc.).

Preferably, the container 1 according to the invention is made of moulded glass, and not of drawn glass (i.e. manufactured from a preform, such as a tube, made of drawn glass). In a manner known per se, such a moulded glass container 1 can be obtained by a "blow-and-blow" or "press-and-blow" process, for example using an IS machine. Indeed, it has been observed that a drawn glass container suffers intrinsically, due to its forming method, from an increased risk of delamination (that is to say a risk of detachment of glass flakes or particles from the surface of the inner face of the container wall by interaction of the glass with the substance contained in the container) with respect to a moulded glass container. Now, the presence of free particles of glass in a substance, in particular a pharmaceutical substance intended to be administered to a human being or to an animal, may have very serious health consequences.

In accordance with the invention, the inner face 4 of the wall 2 of the container 1 forms a bare glass surface intended to come into direct contact with said substance. In other words, the inner face 4 of the glass wall 2 is devoid of any continuous surface layer exogenous to the glass of the wall 2, which would have been deposited on the inner face 4 in order to separate the latter from the substance that the accommodation cavity 3 of the container 1 is intended to contain. More precisely, the inner face 4 of the glass wall 2 is devoid of any additional barrier coating, exogenous to the glass of the wall 2, designed to prevent the migration of one or more chemical species or elements contained in the glass of the glass wall 2 to said substance, and vice versa. The inner face 4 of the wall 2 of the container 1 is therefore in particular devoid of surface layer that would be formed of an oxide, a nitride or an oxynitride of an element chosen among the group consisted of silicon Si, aluminium Al, titanium Ti, boron B, zirconium Zr, tantalum Ta, or a mixture of these latter, and/or also formed of an organic material, as for example one or several polysilosanes (silicone), etc. Even so, it is not excluded that the container 1 can have at the surface of its inner face 4, and in particular upstream from a filling of the accommodation cavity 3 with said substance, one or more chemical species exogenous to the glass of the wall 2, insofar as theses species do not form a coating layer intended to protect the glass of the wall 2 and the substance contained in the accommodation cavity 3 against any chemical interaction between them. So formed of soda-lime glass devoid of barrier coating deposited on the inner face 4 of its glass wall 2, the container 1 according to the invention is thus relatively easy and inexpensive to manufacture.

According to the invention, and although the glass wall 2 of the container 1 is generally formed, as already described hereinabove, of a soda-lime glass, the wall 2 has a very particular atomic profile of sodium in the vicinity of the surface of its inner face 4, and over a particular depth under said surface, which provides the container 1 with very interesting properties in terms of chemical resistance of the glass of said wall 2 with respect to the substance intended to be contained in said container 1. In particular, said glass wall 2 of the container according to the invention has an atomic fraction of sodium that is lower than 4 at. % up to a depth of at least 200 nm (+/−1 nm) from the surface of the inner face 4 of the wall 2. Thus, from the surface of the inner face 4 of the glass wall 2, and up to a depth of at least 200 nm, the glass of the wall 2 has an atomic fraction of sodium that does not exceed 4 at. %.

This atomic fraction, as well as all the atomic fractions which will be discussed below, is measured, analysed, by X-ray induced photoelectron spectrometry (XPS). Advantageously, the atomic fractions discussed in the present disclosure of the invention are measured by X-ray induced photoelectron spectrometry (XPS), with a detection angle of 90° (+/−1°) with respect to the surface of the inner face 4, using an XPS spectrometry hardware and software system comprising a monochromatic Al Kalpha X-ray source, with a diameter of analysed area between 50 μm and 1 000 μm (and for example 400 μm), and with a deep abrasion of the surface of the inner face 4 under a flow of argon ions, with an energy preferentially between 0.5 keV and 5 keV (and for example 2 keV), with a speed of erosion preferentially between 5 nm/min and 10 nm/min (and for example of 8.5 nm/min). Well known as such, such an XPS measurement can be made for example using a spectrometry hardware and software system Thermo Scientific™ K-Alpha™ sold by the ThermoFischer company, with a monochromatic Al Kalpha X-ray source, a diameter of analysed area of typically 400 μm, and with a deep abrasion of the surface under a flow of argon ions, with an energy of 2 keV, with a speed of erosion (measured on a layer of $SiO_2$) of 8.5 nm/min, for example.

The value of atomic fraction of sodium, up to a depth of at least 200 nm (+/−1 nm), being thus at most equal to 4 at. %, it is even more advantageous that said atomic fraction of sodium is lower than or equal to 3.5 at. %, preferably lower than or equal to 3.3 at. %, preferably lower than or equal to 3 at. %, preferably lower than or equal to 2.8 at. %, preferably lower than or equal to 2.6 at. %, and still preferably lower than or equal to 2.5 at. %, up to a depth of at least 200 nm (+/−1 nm) from the surface of the inner face 4.

The profile of atomic fraction of sodium of the glass of the wall 2 over such a depth of 200 nm is not necessarily strictly homogeneous at any depth between 0 nm and 200 nm. In particular, given the generally gradual nature over time of an attack on the glass by a substance contained in the accommodation cavity 3, it is advantageous in terms of chemical resistance of the glass that the atomic fraction of sodium is, on average, of a value that decreases from the inside, i.e. from the very heart, of the glass wall 2 towards the surface of the inner face 4 of the latter.

Preferably, the glass wall 2 advantageously has an atomic fraction of sodium that is lower than or equal to 3.5 at. %, preferably lower than or equal to 3.3 at. %, preferably lower than or equal to 3 at. %, preferably lower than or equal to 2.8 at. %, preferably lower than or equal to 2.6 at. %, preferably lower than or equal to 2.5 at. %, preferably lower than or equal to 2.4 at. %, preferably lower than or equal to 2.3 at. %, and still preferably lower than or equal to 2.2 at. %, up to a depth of at least 100 nm (+/−1 nm) from the surface of the inner face 4.

As an alternative or a complement, the glass wall 2 advantageously has an atomic fraction of sodium that is lower than or equal to 2.4 at. %, preferably lower than or equal to 2.3 at. %, preferably lower than or equal to 2.2 at. %, preferably lower than or equal to 2.1 at. %, preferably lower than or equal to 2.0 at. %, preferably lower than or equal to 1.9 at. %, and still preferably lower than or equal to 1.8 at. %, up to a depth of 30 nm (+/−1 nm) from the surface of the inner face 4.

As an alternative or a complement, the glass wall 2 advantageously has an atomic fraction of sodium that is lower than or equal to 2.0 at. %, preferably lower than or equal to 1.9 at. %, preferably lower than or equal to 1.8 at. %, preferably lower than or equal to 1.7 at. %, preferably lower than or equal to 1.6 at. %, preferably lower than or equal to 1.5 at. %, preferably lower than or equal to 1.4 at. %, preferably lower than or equal to 1.3 at. %, preferably lower than or equal to 1.2 at. %, preferably lower than or equal to 1.1 at. %, and still preferably lower than or equal to 1.0 at. %, up to a depth of 15 nm (+/−1 nm) from the surface of the inner face 4.

As an alternative or a complement, the glass wall 2 advantageously has an atomic fraction of sodium that is lower than or equal to 2.0 at. %, preferably lower than or equal to 1.9 at. %, preferably lower than or equal to 1.8 at. %, preferably lower than or equal to 1.7 at. %, preferably lower than or equal to 1.6 at. %, preferably lower than or equal to 1.5 at. %, preferably lower than or equal to 1.4 at. %, preferably lower than or equal to 1.3 at. %, preferably lower than or equal to 1.2 at. %, preferably lower than or equal to 1.1 at. %, and still preferably lower than or equal to 1.0 at. %, up to a depth of 7 nm from the surface of the inner face 4.

As an alternative or a complement, the glass wall 2 advantageously has an atomic fraction of sodium that is lower than or equal to 1.5 at. %, preferably lower than or equal to 1.4 at. %, preferably lower than or equal to 1.3 at. %, preferably lower than or equal to 1.2 at. %, preferably lower than or equal to 1.1 at. %, preferably lower than or equal to 1.0 at. %, preferably lower than or equal to 0.8 at. %, preferably lower than or equal to 0.6 at. %, and still preferably lower than or equal to 0.5 at. %, at a depth of 0 nm (+/−1 nm, i.e. between 0 nm and 1 nm) from the surface of the inner face 4.

According to combination characterizing an especially interesting profile of atomic fraction of sodium, the glass wall 2 advantageously has an atomic fraction of sodium that is lower than or equal to 2.5 at. % up to a depth of at least 200 nm (+/−1 nm) from the surface of the inner face 4, lower than or equal to 2.0 at. % up to a depth of at least 30 nm (+/−1 nm) from the surface of the inner face 4, while being lower than or equal to 1.0 at. %, and preferably lower than or equal to 0.5 at. %, at a depth of 0 nm (+/−1 nm) from the surface of the inner face 4.

As an alternative or a complement, the container 1 can advantageously have certain particular features in terms of ratio of an atomic fraction of one or more other atomic elements in the glass (in particular sodium, calcium and aluminium) to an atomic fraction of silicon, which contribute to a particular patterning of the glass network in the vicinity of the surface of the inner face 4, tending to still improve the glass resistance with respect to the substance intended to be contained in the accommodation cavity 3 of the container 1.

In particular, the glass wall 2 of the container 1 has advantageously a ratio of an atomic fraction of sodium to an atomic fraction of silicon, said atomic fractions being measured by X-ray induced photoelectron spectrometry as mentioned hereinabove, that is lower than or equal to 0.130, preferably lower than or equal to 0.120, preferably lower than or equal to 0.110, preferably lower than or equal to 0.100, preferably lower than or equal to 0.090, and still preferably lower than or equal to 0.080, up to a depth of at least 200 nm (+/−1 nm) from the surface of the inner face 4.

As an alternative or a complement, the glass wall 2 advantageously has a ratio of an atomic fraction of sodium to an atomic fraction of silicon, measured by X-ray induced photoelectron spectrometry, that is lower than or equal to 0.130, preferably lower than or equal to 0.120, preferably lower than or equal to 0.100, preferably lower than or equal to 0.090, preferably lower than or equal to 0.080, still preferably lower than or equal to 0.070, up to a depth of at least 100 nm (+/−1 nm) from the surface of the inner face 4.

As an alternative or a complement, the glass wall 2 advantageously has a ratio of an atomic fraction of sodium to an atomic fraction of silicon, measured by X-ray induced photoelectron spectrometry, that is lower than or equal to 0.080, preferably lower than or equal to 0.070, and still preferably lower than or equal to 0.060, up to a depth of at least 30 nm (+/−1 nm) from the surface of the inner face 4.

As an alternative or a complement, the glass wall 2 advantageously has a ratio of an atomic fraction of sodium to an atomic fraction of silicon, measured by X-ray induced photoelectron spectrometry, that is lower than or equal to 0.080, preferably lower than or equal to 0.070, preferably lower than or equal to 0.060, preferably lower than or equal to 0.050, and still preferably lower than or equal to 0.040, to a depth of at least 15 nm (+/−1 nm) from the surface of the inner face 4.

As an alternative or a complement, the glass wall 2 advantageously has a ratio of an atomic fraction of sodium to an atomic fraction of silicon, measured by X-ray induced photoelectron spectrometry, that is lower than or equal to 0.080, preferably lower than or equal to 0.070, preferably lower than or equal to 0.060, preferably lower than or equal to 0.050, preferably lower than or equal to 0.040, and still preferably lower than or equal to 0.030, to a depth of at least 7 nm (+/−1 nm) from the surface of the inner face 4.

As an alternative or a complement, the glass wall 2 advantageously has a ratio of an atomic fraction of sodium to an atomic fraction of silicon, measured by X-ray induced photoelectron spectrometry, that is lower than or equal to 0.050, preferably lower than or equal to 0.040, preferably lower than or equal to 0.030, and still preferably lower than or equal to 0.020, at a depth of 0 nm (+/−1 nm) from the surface of the inner face 4.

The comparison between atomic fractions of sodium and silicon is here interesting in that it reflects a comparison of an atomic concentration of modifier ion (in this case, sodium) and an atomic concentration of former ion (in this case, silicon). The advantageous ratios proposed herein-above thus reflects the fact that, in the vicinity of the inner face 4 of the glass wall 2, the glass is particularly rich in former ions, which contributes to its chemical resistance.

As an alternative or a complement, the glass wall 2 advantageously has a ratio of an atomic fraction of calcium to an atomic fraction of silicon, still measured by X-ray induced photoelectron spectrometry, that is lower than or equal to 0.240, preferably lower than or equal to 0.230, preferably lower than or equal to 0.220, and still preferably lower than or equal to 0.210, up to a depth of at least 200 nm (+/−1 nm) from the surface of the inner face 4.

As an alternative or a complement, the glass wall 2 advantageously has a ratio of an atomic fraction of calcium to an atomic fraction of silicon, measured by X-ray induced photoelectron spectrometry, that is lower than or equal to 0.230, preferably lower than or equal to 0.220, and still preferably lower than or equal to 0.210, up to a depth of at least 100 nm (+/−1 nm) from the surface of the inner face 4.

As an alternative or a complement, the glass wall 2 advantageously has a ratio of an atomic fraction of calcium to an atomic fraction of silicon, measured by X-ray induced photoelectron spectrometry, that is lower than or equal to 0.210, preferably lower than or equal to 0.200, preferably lower than or equal to 0.190, preferably lower than or equal to 0.180, preferably lower than or equal to 0.170, and still preferably lower than or equal to 0.160, to a depth of at least 30 nm (+/−1 nm) from the surface of the inner face 4.

As an alternative or a complement, the glass wall 2 advantageously has a ratio of an atomic fraction of calcium to an atomic fraction of silicon, measured by X-ray induced photoelectron spectrometry, that is lower than or equal to 0.200, preferably lower than or equal to 0.180, preferably lower than or equal to 0.170, preferably lower than or equal to 0.160, preferably lower than or equal to 0.150, preferably lower than or equal to 0.140, preferably lower than or equal to 0.130, still preferably lower than or equal to 0.120, up to a depth of at least 15 nm (+/−1 nm) from the surface of the inner face 4. As an alternative or a complement, the glass wall 2 advantageously has a ratio of an atomic fraction of calcium to an atomic fraction of silicon, measured by X-ray induced photoelectron spectrometry, that is lower than or equal to 0.130, preferably lower than or equal to 0.120, preferably lower than or equal to 0.110, preferably lower than or equal to 0.100, still preferably lower than or equal to 0.090, at a depth of at least 7 nm (+/−1 nm) from the surface of the inner face 4. As an alternative or a complement, the glass wall 2 advantageously has a ratio of an atomic fraction of calcium to an atomic fraction of silicon, measured by X-ray induced photoelectron spectrometry, that is lower than or equal to 0.050, preferably lower than or equal to 0.040, preferably lower than or equal to 0.030, and still preferably lower than or equal to 0.020, at a depth of 0 nm (+/−1 nm) from the surface of the inner face 4.

As an alternative or a complement, the glass wall 2 advantageously has a ratio of an atomic fraction of aluminium to an atomic fraction of silicon, measured by X-ray induced photoelectron spectrometry, that is lower than or equal to 0.040, and preferably lower than or equal to 0.030, up to a depth of at least 200 nm (+/−1 nm) from the surface of the inner face 4.

As an alternative or a complement, the glass wall 2 advantageously has a ratio of an atomic fraction of aluminium to an atomic fraction of silicon, measured by X-ray induced photoelectron spectrometry, that is lower than or equal to 0.040, preferably lower than or equal to 0.030, and still preferably lower than or equal to 0.020, up to a depth of at least 100 nm (+/−1 nm) from the surface of the inner face 4.

As an alternative or a complement, the glass wall 2 has a ratio of an atomic fraction of aluminium to an atomic fraction of silicon, measured by X-ray induced photoelectron spectrometry, that is lower than or equal to 0.050, preferably lower than or equal to 0.040, preferably lower than or equal to 0.030, and still preferably lower than or equal to 0.020, up to a depth of at least 30 nm (+/−1 nm) from the surface of the inner face 4. As an alternative or a complement, the glass wall 2 has a ratio of an atomic fraction of aluminium to an atomic fraction of silicon, measured by X-ray induced photoelectron spectrometry, that is lower than or equal to 0.050, preferably lower than or equal to 0.040, preferably lower than or equal to 0.030, and still preferably lower than or equal to 0.020, up to a depth of at least 15 nm (+/−1 nm) from the surface of the inner face 4.

As an alternative or a complement, the glass wall 2 has a ratio of an atomic fraction of aluminium to an atomic fraction of silicon, measured by X-ray induced photoelectron spectrometry, that is lower than or equal to 0.040, preferably lower than or equal to 0.030, and still preferably lower than or equal to 0.020, at a depth of 0 nm (+/−1 nm) from the surface of the inner face 4.

After having undergone a filling and ageing protocol as defined in chapter 660 of the USP (U.S. Pharmacopoeia) or in chapter 3.2.1. of the European Pharmacopoeia (i.e. 1 h at 121° C. in an autoclave, filled with ultra-pure water), the container 1 thus has a total quantity of extractables (species extracted from the glass) per surface unit that is advantageously lower than $1.50 \times 10^{-1}$ µg·cm$^{-2}$, and even more advantageously lower than $1.00 \times 10^{-1}$ µg·cm$^{-2}$, among which a quantity of extracted sodium advantageously lower than $0.80 \times 10^{-1}$ µg·cm$^{-2}$, and even more advantageously lower than $0.50 \times 10^{-1}$ µg·cm$^{-2}$.

After having undergone a filling protocol as defined in chapter 660 of the USP (U.S. Pharmacopoeia) or in chapter 3.2.1. of the European Pharmacopoeia, and having under-gone an ageing in an autoclave for 6 h in continuous at 121° C., filled with ultra-pure water, the container 1 according to the invention thus has a total quantity of extractables per surface unit that is advantageously lower than $8.0 \times 10^{-1}$ $\mu g \cdot cm^{-2}$, and even more advantageously lower than $2.5 \times 10^{-1}$ $\mu g \cdot cm^{-2}$, among which a quantity of extracted sodium advantageously lower than $2.50 \times 10^{-1}$ $\mu g \cdot cm^{-2}$, and even more advantageously lower than $1.50 \times 10^{-1}$ $\mu g \cdot cm^{-2}$.

Advantageously, these results may be observed by inductively coupled plasma emission spectrometry (ICP-OES) analysis, for example using a hardware and software system ICP-OES PerkinElmer® Optima™ 7300 DV, with a Meinhard cyclone spray chamber and argon purge (white release values subtracted-acidified solutions 2% suprapure HNO3-without dilution. Acquisition time 20 seconds. Quantification by measuring the area under the peak with background correction at 2 points. Systematic rinsing between samples).

Such properties in terms of quantities of extractables are inventions in their own rights. Thus, is an invention in its own right a container 1 comprising a glass wall 2 delimiting an accommodation cavity 3 for a substance, in particular for a pharmaceutical or diagnostic substance, said glass wall 2 having an inner face 4 located facing said accommodation cavity 3, said wall 2 being made of soda-lime glass, said inner face 4 forming a bare glass surface intended to come into direct contact with the substance, said container 1 having a total quantity of extractables (species extracted from the glass) per surface unit that is lower than $1.50 \times 10^{-1}$ $\mu g \cdot cm^{-2}$, and still preferably lower than $1.00 \times 10^{-1}$ $\mu g \cdot cm^{-2}$, after having undergone a filling and ageing protocol as defined in chapter 660 of the USP (U.S. Pharmacopoeia) or in chapter 3.2.1. of the European Pharmacopoeia (i.e. during 1 h at 121° C. in an autoclave, filled with ultra-pure water).

Is also an invention in its own right a container 1 comprising a glass wall 2 delimiting an accommodation cavity 3 for a substance, in particular for a pharmaceutical or diagnostic substance, said glass wall 2 having an inner face 4 located facing said accommodation cavity 3, said wall 2 being made of soda-lime glass, said inner face 4 forming a bare glass surface intended to come into direct contact with the substance, said container 1 having a quantity of extracted sodium that is lower than $0.80 \times 10^{-1}$ $\mu g \cdot cm^{-2}$, and preferably lower than $0.50 \times 10^{-1}$ $\mu g \cdot cm^{-2}$, after having undergone a filling and ageing protocol as defined in chapter 660 of the USP (U.S. Pharmacopoeia) or in chapter 3.2.1. of the European Pharmacopoeia (i.e. during 1 h at 121° C. in an autoclave, filled with ultra-pure water).

Is moreover an invention in its own right a container 1 comprising a glass wall 2 delimiting an accommodation cavity 3 for a substance, in particular for a pharmaceutical or diagnostic substance, said glass wall 2 having an inner face 4 located facing said accommodation cavity 3, said wall 2 being made of soda-lime glass, said inner face 4 forming a bare glass surface intended to come into direct contact with the substance, said container 1 having a total quantity of extractables per surface unit that is lower than $8.0 \times 10^{-1}$ $\mu g \cdot cm^{-2}$, and preferably lower than $2.5 \times 10^{-1}$ $\mu g \cdot cm^{-2}$, after having undergone a filling protocol as defined in chapter 660 of the USP (U.S. Pharmacopoeia) or in chapter 3.2.1. of the European Pharmacopoeia, and having undergone an ageing in an autoclave for 6 h in continuous at 121° C., filled with ultra-pure water.

Is further an invention in its own right a container 1 comprising a glass wall 2 delimiting an accommodation cavity 3 for a substance, in particular for a pharmaceutical or diagnostic substance, said glass wall 2 having an inner face 4 located facing said accommodation cavity 3, said wall 2 being made of soda-lime glass, said inner face 4 forming a bare glass surface intended to come into direct contact with the substance, said container 1 having a quantity of sodium extracted that is lower than $2.50 \times 10^{-1}$ $\mu g \cdot cm^{-2}$, and preferably lower than $1.50 \times 10^{-1}$ $\mu g \cdot cm^{-2}$, after having undergone a filling protocol as defined in chapter 660 of the USP (U.S. Pharmacopoeia) or in chapter 3.2.1. of the European Pharmacopoeia, and having undergone an ageing in an autoclave for 6 h in continuous at 121° C., filled with ultra-pure water.

In view of the above, the container 1 with a glass wall 2 according to the invention has excellent characteristics in terms of controlling the phenomenon of elution of species present in the glass, which means a particularly strong chemical resistance, and makes said container 1 particularly suitable for receiving into its accommodation cavity 3 a substance that is particularly sensitive to said species and/or particularly aggressive to glass.

Advantageously, but without being limited thereto, a container 1 according to the invention can be obtained, in a manner that is particularly simple, inexpensive, efficient and safe in terms of health and environment, from a container (or primary container) of the Type III moulded soda-lime glass vial type, by subjecting the latter to a dealkalization treatment of the glass in the vicinity of the surface of the inner face of its glass wall by introduction into the accommodation cavity of the container, using an injection head located remote from the opening of the container and out of the latter, whereas said glass wall is at a temperature between about 500° C. and 600° C., of a liquid dose of ammonium sulphate $(NH_4)_2SO_4$ dissolved in water. Preferably, the concentration of ammonium sulphate in the liquid dose will be chosen close or just below the saturation concentration. The volume of said liquid dose may obviously vary according to the size, and in particular the nominal volume, of the considered container.

The following, non-limiting, examples illustrate certain particularly interesting properties of containers 1 according to the invention in terms of performance in controlling the risks of elution of certain chemical species from the glass.

Example 1—A first series of containers 1 according to the invention has been manufactured from primary containers of the Type III moulded soda-lime glass vial type, of 20 mL nominal capacity. These primary containers have been subjected to a dealkalization treatment of the glass in the vicinity of the surface of the inner face of their glass wall by introduction into the accommodation cavity of the primary containers, using an injection head located remote from the opening of the primary containers and out of these latter, whereas the glass wall of the primary containers was at a temperature of about 600° C., of a liquid dose of ammonium sulphate $(NH_4)_2SO_4$ dissolved in demineralized water, in a concentration close or just below the saturation concentration (volume of the liquid dose: 26 μL).

Table 1 below compiles results obtained for one of the containers according to Example 1, by X-ray induced photoelectron spectrometry (XPS) as described hereinabove, in terms of atomic fraction (in at. %) and ratio of atomic fractions of certain species of the wall glass, at different depths from the surface of the inner face of this wall.

TABLE 1

| | Atomic fractions of elementary species (at. %) | | | | | | | Atomic fraction ratios | | |
|---|---|---|---|---|---|---|---|---|---|---|
| Depth (nm) | C1s | Al2p | Mg2s | Si2p | K2p | Ca2p | O1s | Na1s | Na/Si | Ca/Si | Al/Si |
| 0 | 6.9 | 0.8 | 0.3 | 30.7 | 0.4 | 0.3 | 60.1 | 0.5 | 0.016 | 0.01 | 0.026 |
| 6.9 | 0 | 1.2 | 0.5 | 31.9 | 0.5 | 3.3 | 60.9 | 1.6 | 0.05 | 0.103 | 0.038 |
| 14.9 | 0 | 0.9 | 0.8 | 29.8 | 0.3 | 5.4 | 61 | 1.7 | 0.057 | 0.181 | 0.03 |
| 29.9 | 0 | 0.5 | 0.6 | 29.9 | 0.3 | 6.1 | 60.9 | 1.6 | 0.054 | 0.204 | 0.017 |
| 99.6 | 0 | 0.8 | 0.5 | 29.8 | 0.3 | 6.2 | 60.4 | 2 | 0.067 | 0.208 | 0.027 |
| 199.2 | 0 | 0.9 | 0.6 | 29.3 | 0.3 | 6.6 | 60.1 | 2.2 | 0.075 | 0.225 | 0.031 |

Table 2 below compiles results obtained for five containers R1 to R5 according to Example 1, by inductively coupled plasma emission spectrometry (ICP-OES) as described hereinabove, in terms of quantities of species extracted from the glass (expressed in μg/L), after having subjected said containers to a filling and ageing protocol as defined in chapter 660 of the USP (U.S. Pharmacopoeia) or in chapter 3.2.1. of the European Pharmacopoeia (i.e. 1 h at 121° C. in an autoclave, filled with ultra-pure water).

TABLE 2

Example 1
(quantities in μg/L)

| Elementary species | R1 | R2 | R3 | R4 | R5 | Average |
|---|---|---|---|---|---|---|
| Si | 66 | 64 | 70 | 66 | 70 | 67 |
| Na | 108 | 113 | 111 | 115 | 123 | 114 |
| K | 8 | 9 | 10 | 11 | 10 | 10 |
| Ca | 21 | 8 | 10 | 9 | 9 | 11 |
| Mg | 6 | 7 | 2 | 3 | 2 | 4 |
| Al | 2 | 2 | 2 | 3 | 2 | 2 |
| Fe | 3 | 10 | 18 | 0 | 0 | 6 |
| B | 0 | 0 | 0 | 0 | 0 | 0 |
| Ba | 0 | 0 | 0 | 0 | 0 | 0 |
| Ti | 0 | 0 | 0 | 0 | 0 | 0 |
| Zn | 0 | 0 | 0 | 0 | 0 | 0 |
| Total extractables | 215 | 214 | 224 | 206 | 216 | 215 |

Table 3 below compiles results obtained for five containers R6 to R10 according to Example 1, by inductively coupled plasma emission spectrometry (ICP-OES) as described hereinabove, in terms of quantities of species extracted from the glass (expressed in μg/L), after having subjected said containers to a filling protocol as defined in chapter 660 of the USP (U.S. Pharmacopoeia) or in chapter 3.2.1. of the European Pharmacopoeia, and an ageing in an autoclave for 6 h in continuous at 121° C., filled with ultra-pure water.

TABLE 3

Example 1
(quantities in μg/L)

| Elementary species | R6 | R7 | R8 | R9 | R10 | Average |
|---|---|---|---|---|---|---|
| Si | 451 | 704 | 727 | 492 | 623 | 599 |
| Na | 273 | 332 | 330 | 309 | 303 | 309 |
| K | 31 | 40 | 44 | 33 | 34 | 36 |
| Ca | 58 | 68 | 91 | 81 | 78 | 75 |
| Mg | 9 | 14 | 17 | 8 | 13 | 12 |
| Al | 15 | 23 | 25 | 15 | 21 | 20 |
| Fe | 1 | 1 | 1 | 1 | 0 | 1 |
| B | 0 | 0 | 0 | 0 | 0 | 0 |
| Ba | 1 | 1 | 1 | 1 | 1 | 1 |
| Ti | 0 | 1 | 1 | 0 | 1 | 1 |
| Zn | 2 | 1 | 2 | 3 | 2 | 2 |
| Total extractables | 840 | 1,184 | 1,237 | 942 | 1,075 | 1,056 |

Example 2—A second series of containers 1 according to the invention has been manufactured from primary containers of the Type III moulded soda-lime glass vial type, of 30 mL nominal capacity. These primary containers have been subjected to a dealkalization treatment identical to that of Example 1, but with a liquid dose volume of 28 μL.

Table 4 below compiles results obtained for one of the containers according to Example 2, by X-ray induced photoelectron spectrometry (XPS) as described hereinabove, in terms of atomic fraction (in at. %) and ratio of atomic fractions of certain species of the wall glass, at different depths from the surface of the inner face of this wall.

TABLE 4

Example 2

| | Atomic fractions of elementary species (at. %) | | | | | | | | Atomic fraction ratios | | |
|---|---|---|---|---|---|---|---|---|---|---|---|
| Depth (nm) | C1s | Al2p | Mg2s | Si2p | K2p | Ca2p | O1s | Na1s | Na/Si | Ca/Si | Al/Si |
| 0 | 7.3 | 0.7 | 0.2 | 30.0 | 0.7 | 1.1 | 59.1 | 1.0 | 0.033 | 0.037 | 0.023 |
| 6.9 | 0.0 | 1.4 | 0.7 | 31.2 | 0.5 | 3.6 | 60.8 | 1.7 | 0.054 | 0.115 | 0.045 |
| 14.9 | 0.0 | 1.1 | 1.0 | 30.3 | 0.3 | 5.8 | 59.9 | 1.6 | 0.053 | 0.191 | 0.036 |
| 29.9 | 0.0 | 1.3 | 0.8 | 29.2 | 0.4 | 5.9 | 60.7 | 1.7 | 0.058 | 0.202 | 0.045 |
| 99.6 | 0.0 | 0.8 | 0.7 | 29.6 | 0.4 | 6.3 | 60.2 | 2.1 | 0.071 | 0.213 | 0.027 |
| 199.2 | 0.0 | 0.9 | 0.6 | 29.6 | 0.3 | 6.0 | 60.5 | 2.3 | 0.078 | 0.203 | 0.030 |

Table 5 below compiles results obtained for five containers R11 to R15 according to Example 2, by inductively coupled plasma emission spectrometry (ICP-OES) as described hereinabove, in terms of quantities of species extracted from the glass (expressed in µg/L), after having subjected said containers to a filling and ageing protocol as defined in chapter 660 of the USP (U.S. Pharmacopoeia) or in chapter 3.2.1. of the European Pharmacopoeia (i.e. 1 h at 121° C. in an autoclave, filled with ultra-pure water).

TABLE 5

| Example 2 (quantities in µg/L) | | | | | | |
|---|---|---|---|---|---|---|
| Elementary species | R11 | R12 | R13 | R14 | R15 | Average |
| Si | 59 | 58 | 45 | 61 | 86 | 62 |
| Na | 150 | 153 | 132 | 148 | 149 | 146 |
| K | 16 | 14 | 12 | 15 | 16 | 14 |
| Ca | 16 | 4 | 3 | 4 | 7 | 7 |
| Mg | 2 | 1 | 1 | 1 | 1 | 1 |
| Al | 3 | 4 | 4 | 4 | 4 | 4 |
| Fe | 2 | 0 | 1 | 0 | 0 | 1 |
| B | 0 | 0 | 0 | 0 | 0 | 0 |
| Ba | 0 | 0 | 0 | 0 | 1 | 0 |
| Ti | 0 | 0 | 0 | 0 | 0 | 0 |
| Zn | 0 | 0 | 0 | 0 | 0 | 0 |
| Total extractables | 248 | 234 | 196 | 233 | 265 | 235 |

Table 6 below compiles results obtained for four containers R16 to R19 according to Example 2, by inductively coupled plasma emission spectrometry (ICP-OES) as described hereinabove, in terms of quantities of species extracted from the glass (expressed in µg/L), after having subjected said containers to a filling protocol as defined in chapter 660 of the USP (U.S. Pharmacopoeia) or in chapter 3.2.1. of the European Pharmacopoeia, and an ageing in an autoclave for 6 h in continuous at 121° C., filled with ultra-pure water.

TABLE 6

| Example 2 (quantities in µg/L) | | | | |
|---|---|---|---|---|
| Elementary species | R16 | R17 | R18 | R19 | Average |
| Si | 1,117 | 641 | 1,093 | 718 | 892 |
| Na | 423 | 396 | 400 | 338 | 389 |
| K | 56 | 37 | 62 | 43 | 49 |
| Ca | 131 | 57 | 130 | 72 | 97 |
| Mg | 26 | 12 | 26 | 17 | 20 |
| Al | 41 | 23 | 42 | 29 | 34 |
| Fe | 1 | 1 | 1 | 1 | 1 |
| B | 0 | 0 | 0 | 0 | 0 |

TABLE 6-continued

| Example 2 (quantities in µg/L) | | | | |
|---|---|---|---|---|
| Elementary species | R16 | R17 | R18 | R19 | Average |
| Ba | 1 | 0 | 1 | 1 | 1 |
| Ti | 1 | 0 | 1 | 1 | 1 |
| Zn | 0 | 0 | 0 | 0 | 0 |
| Total extractables | 1,796 | 1,167 | 1,755 | 1,218 | 1,484 |

Example 3—A third series of containers 1 according to the invention has been manufactured from primary containers of the Type Ill moulded soda-lime glass vial type, of 50 mL nominal capacity. These primary containers have been subjected to a dealkalization treatment identical to that of Example 1, but with a liquid dose volume of 26 µL.

Table 7 below compiles results obtained for one of the containers according to Example 3, by X-ray induced photoelectron spectrometry (XPS) as described hereinabove, in terms of atomic fraction (in at. %) and ratio of atomic fractions of certain species of the wall glass, at different depths from the surface of the inner face of this wall.

TABLE 7

| Example 3 | | | | | | | | | | | |
|---|---|---|---|---|---|---|---|---|---|---|---|
| | Atomic fractions of elementary species (at. %) | | | | | | | | Atomic fraction ratios | | |
| Depth (nm) | C1s | Al2p | Mg2s | Si2p | K2p | Ca2p | O1s | Na1s | Na/Si | Ca/Si | Al/Si |
| 0 | 6.7 | 0.7 | 0.0 | 29.6 | 0.6 | 0.6 | 61.3 | 0.6 | 0.020 | 0.020 | 0.024 |
| 6.9 | 0.0 | 1.0 | 0.6 | 30.9 | 0.5 | 3.4 | 62.1 | 1.6 | 0.052 | 0.110 | 0.032 |
| 14.9 | 0.0 | 1.0 | 0.8 | 29.7 | 0.3 | 5.5 | 61.0 | 1.7 | 0.057 | 0.185 | 0.034 |
| 29.9 | 0.0 | 0.9 | 0.7 | 29.3 | 0.5 | 6.0 | 60.9 | 1.8 | 0.061 | 0.205 | 0.031 |
| 99.6 | 0.0 | 1.1 | 0.7 | 29.5 | 0.2 | 6.1 | 60.3 | 2.2 | 0.075 | 0.207 | 0.037 |
| 199.2 | 0.0 | 0.7 | 0.9 | 28.9 | 0.3 | 5.9 | 60.7 | 2.6 | 0.090 | 0.204 | 0.024 |

Table 8 below compiles results obtained for five containers R20 to R24 according to Example 3, by inductively coupled plasma emission spectrometry (ICP-OES) as described hereinabove, in terms of quantities of species extracted from the glass (expressed in µg/L), after having subjected said containers to a filling and ageing protocol as defined in chapter 660 of the USP (U.S. Pharmacopoeia) or in chapter 3.2.1. of the European Pharmacopoeia (i.e. 1 h at 121° C. in an autoclave, filled with ultra-pure water).

TABLE 8

| Example 3 (quantities in µg/L) | | | | | | |
|---|---|---|---|---|---|---|
| Elementary species | R20 | R21 | R22 | R23 | R24 | Average |
| Si | 54 | 54 | 39 | 48 | 82 | 55 |
| Na | 117 | 114 | 60 | 97 | 132 | 104 |
| K | 22 | 23 | 11 | 15 | 26 | 20 |
| Ca | 121 | 38 | 8 | 10 | 32 | 42 |
| Mg | 14 | 7 | 3 | 2 | 3 | 6 |

TABLE 8-continued

| Example 3 (quantities in μg/L) | | | | | | |
|---|---|---|---|---|---|---|
| Elementary species | R20 | R21 | R22 | R23 | R24 | Average |
| Al | 4 | 27 | 0 | 2 | 3 | 7 |
| Fe | 1 | 10 | 0 | 0 | 0 | 2 |
| B | 0 | 16 | 0 | 0 | 1 | 3 |
| Ba | 1 | 1 | 1 | 0 | 0 | 1 |

TABLE 8-continued

| Example 3 (quantities in μg/L) | | | | | | |
|---|---|---|---|---|---|---|
| Elementary species | R20 | R21 | R22 | R23 | R24 | Average |
| Ti | 0 | 0 | 0 | 0 | 0 | 0 |
| Zn | 22 | 5 | 1 | 1 | 3 | 6 |
| Total extractables | 357 | 296 | 122 | 175 | 283 | 247 |

Table 9 below compiles results obtained for five containers R25 to R29 according to Example 3, by inductively coupled plasma emission spectrometry (ICP-OES) as described hereinabove, in terms of quantities of species extracted from the glass (expressed in μg/L), after having subjected said containers to a filling protocol as defined in chapter 660 of the USP (U.S. Pharmacopoeia) or in chapter 3.2.1. of the European Pharmacopoeia, and an ageing in an autoclave for 6 h in continuous at 121° C., filled with ultra-pure water.

TABLE 9

| Example 3 (quantities in μg/L) | | | | | | |
|---|---|---|---|---|---|---|
| Elementary species | R25 | R26 | R27 | R28 | R29 | Average |
| Si | 262 | 157 | 234 | 232 | 223 | 222 |
| Na | 274 | 128 | 201 | 233 | 228 | 213 |
| K | 44 | 36 | 39 | 39 | 40 | 39 |
| Ca | 54 | 44 | 34 | 40 | 42 | 43 |
| Mg | 9 | 9 | 7 | 6 | 6 | 7 |
| Al | 11 | 7 | 10 | 10 | 10 | 10 |
| Fe | 0 | 0 | 0 | 7 | 0 | 1 |
| B | 0 | 0 | 0 | 0 | 0 | 0 |
| Ba | 0 | 0 | 0 | 0 | 0 | 0 |
| Ti | 0 | 0 | 0 | 0 | 0 | 0 |
| Zn | 1 | 0 | 0 | 0 | 0 | 0 |
| Total extractables | 655 | 381 | 525 | 568 | 550 | 535 |

Example 4—A fourth series of containers 1 according to the invention has been manufactured from primary containers of the Type Ill moulded soda-lime glass vial type, of 100 mL nominal capacity. These primary containers have been subjected to a dealkalization treatment identical to that of Example 1, but with a liquid dose volume of 30 μL.

Table 10 below compiles results obtained for one of the containers according to Example 4, by X-ray induced photoelectron spectrometry (XPS) as described hereinabove, in terms of atomic fraction (in at. %) and ratio of atomic fractions of certain species of the wall glass, at different depths from the surface of the inner face of this wall.

TABLE 10

| | Example 4 | | | | | | | | | | |
|---|---|---|---|---|---|---|---|---|---|---|---|
| | Atomic fractions of elementary species (at. %) | | | | | | | | Atomic fraction ratios | | |
| Depth (nm) | C1s | Al2p | Mg2s | Si2p | K2p | Ca2p | O1s | Na1s | Na/Si | Ca/Si | Al/Si |
| 0 | 5.1 | 0.7 | 0.5 | 30.4 | 0.6 | 1.2 | 61.0 | 0.6 | 0.020 | 0.039 | 0.023 |
| 6.9 | 0.0 | 0.9 | 0.7 | 30.7 | 0.4 | 4.2 | 62.0 | 1.0 | 0.033 | 0.137 | 0.029 |
| 14.9 | 0.0 | 1.1 | 0.7 | 30.4 | 0.3 | 5.8 | 60.8 | 1.0 | 0.033 | 0.191 | 0.036 |
| 29.9 | 0.0 | 0.7 | 0.7 | 29.8 | 0.3 | 6.0 | 61.3 | 1.3 | 0.044 | 0.201 | 0.023 |
| 99.6 | 0.0 | 0.9 | 0.7 | 29.7 | 0.5 | 6.1 | 60.2 | 1.9 | 0.064 | 0.205 | 0.030 |
| 199.2 | 0.0 | 0.8 | 0.8 | 29.4 | 0.2 | 6.0 | 60.3 | 2.5 | 0.085 | 0.204 | 0.027 |

Table 11 below compiles results obtained for five containers R30 to R34 according to Example 4, by inductively coupled plasma emission spectrometry (ICP-OES) as described hereinabove, in terms of quantities of species extracted from the glass (expressed in μg/L), after having subjected said containers to a filling and ageing protocol as defined in chapter 660 of the USP (U.S. Pharmacopoeia) or in chapter 3.2.1. of the European Pharmacopoeia (i.e. 1 h at 121° C. in an autoclave, filled with ultra-pure water).

TABLE 11

| Example 4 (quantities in μg/L) | | | | | | |
|---|---|---|---|---|---|---|
| Elementary species | R30 | R31 | R32 | R33 | R34 | Average |
| Si | 24 | 24 | 36 | 22 | 21 | 25 |
| Na | 86 | 70 | 93 | 61 | 76 | 77 |
| K | 12 | 14 | 17 | 11 | 16 | 14 |
| Ca | 7 | 9 | 7 | 5 | 3 | 6 |
| Mg | 0 | 1 | 1 | 1 | 0 | 1 |
| Al | 1 | 1 | 2 | 1 | 1 | 1 |
| Fe | 2 | 1 | 16 | 2 | 0 | 4 |
| B | 0 | 0 | 0 | 0 | 0 | 0 |
| Ba | 0 | 0 | 0 | 0 | 0 | 0 |
| Ti | 0 | 0 | 0 | 0 | 0 | 0 |
| Zn | 0 | 2 | 0 | 1 | 0 | 1 |
| Total extractables | 133 | 123 | 171 | 103 | 117 | 130 |

Table 12 below compiles results obtained for five containers R35 to R39 according to Example 4, by inductively coupled plasma emission spectrometry (ICP-OES) as described hereinabove, in terms of quantities of species extracted from the glass (expressed in μg/L), after having subjected said containers to a filling protocol as defined in chapter 660 of the USP (U.S. Pharmacopoeia) or in chapter 3.2.1. of the European Pharmacopoeia, and an ageing in an autoclave for 6 h in continuous at 121° C., filled with ultra-pure water.

TABLE 12

| Elementary species | | | Example 4 (quantities in µg/L) | | | |
|---|---|---|---|---|---|---|
| | R35 | R36 | R37 | R38 | R39 | Average |
| Si | 39 | 85 | 99 | 46 | 84 | 71 |
| Na | 111 | 114 | 96 | 146 | 204 | 134 |
| K | 19 | 21 | 24 | 22 | 45 | 26 |
| Ca | 19 | 48 | 29 | 21 | 207 | 65 |
| Mg | 1 | 3 | 3 | 1 | 5 | 2 |
| Al | 4 | 5 | 4 | 3 | 9 | 5 |
| Fe | 0 | 0 | 0 | 0 | 0 | 0 |
| B | 0 | 0 | 0 | 0 | 0 | 0 |
| Ba | 1 | 0 | 0 | 0 | 2 | 1 |
| Ti | 0 | 0 | 0 | 0 | 0 | 0 |
| Zn | 2 | 3 | 2 | 3 | 19 | 5 |
| Total extractables | 196 | 277 | 258 | 241 | 574 | 309 |

Example 5—A fifth series of containers 1 according to the invention has been manufactured from primary containers of the Type Ill moulded soda-lime glass vial type, of 250 mL nominal capacity. These primary containers have been subjected to a dealkalization treatment identical to that of Example 1, but with a liquid dose volume of 42 µL.

Table 13 below compiles results obtained for one of the containers according to Example 5, by X-ray induced photoelectron spectrometry (XPS) as described hereinabove, in terms of atomic fraction (in at. %) and ratio of atomic fractions of certain species of the wall glass, at different depths from the surface of the inner face of this wall.

TABLE 13

| | | | Example 5 | | | | | | | |
|---|---|---|---|---|---|---|---|---|---|---|
| | Atomic fractions of elementary species (at. %) | | | | | | | | Atomic fraction ratios | |
| Depth (nm) | C1s | Al2p | Mg2s | Si2p | K2p | Ca2p | O1s | Na1s | Na/Si | Ca/Si | Al/Si |
| 0 | 4.2 | 0.5 | 0.1 | 31.6 | 0.4 | 0.6 | 62.1 | 0.6 | 0.019 | 0.019 | 0.016 |
| 6.9 | 0.0 | 0.7 | 0.7 | 31.9 | 0.7 | 2.7 | 62.3 | 1.1 | 0.034 | 0.085 | 0.022 |
| 14.9 | 0.0 | 1.0 | 0.7 | 29.9 | 0.5 | 4.8 | 61.4 | 1.8 | 0.060 | 0.161 | 0.033 |
| 29.9 | 0.0 | 1.1 | 0.6 | 29.7 | 0.4 | 6.0 | 60.3 | 1.9 | 0.064 | 0.202 | 0.037 |
| 99.6 | 0.0 | 0.6 | 0.6 | 29.4 | 0.3 | 6.2 | 60.5 | 2.4 | 0.082 | 0.211 | 0.020 |
| 199.2 | 0.0 | 0.9 | 0.7 | 28.8 | 0.3 | 6.4 | 60.2 | 2.6 | 0.090 | 0.222 | 0.031 |

Table 14 below compiles results obtained for five containers R40 to R44 according to Example 5, by inductively coupled plasma emission spectrometry (ICP-OES) as described hereinabove, in terms of quantities of species extracted from the glass (expressed in µg/L), after having subjected said containers to a filling and ageing protocol as defined in chapter 660 of the USP (U.S. Pharmacopoeia) or in chapter 3.2.1. of the European Pharmacopoeia (i.e. 1 h at 121° C. in an autoclave, filled with ultra-pure water).

TABLE 14

| Elementary species | | | Example 5 (quantities in µg/L) | | | |
|---|---|---|---|---|---|---|
| | R40 | R41 | R42 | R43 | R44 | Average |
| Si | 18 | 18 | 17 | 15 | 16 | 17 |
| Na | 53 | 51 | 38 | 42 | 47 | 46 |
| K | 14 | 14 | 10 | 14 | 14 | 13 |
| Ca | 12 | 11 | 2 | 12 | 8 | 9 |
| Mg | 0 | 1 | 1 | 1 | 1 | 1 |
| Al | 3 | 1 | 1 | 1 | 1 | 1 |

TABLE 14-continued

| Elementary species | | | Example 5 (quantities in µg/L) | | | |
|---|---|---|---|---|---|---|
| | R40 | R41 | R42 | R43 | R44 | Average |
| Fe | 1 | 5 | 0 | 2 | 0 | 2 |
| B | 0 | 0 | 0 | 0 | 0 | 0 |
| Ba | 0 | 0 | 0 | 1 | 0 | 0 |
| Ti | 0 | 0 | 0 | 0 | 0 | 0 |
| Zn | 0 | 1 | 0 | 4 | 0 | 1 |
| Total extractables | 102 | 102 | 68 | 91 | 87 | 90 |

Table 15 below compiles results obtained for five containers R45 to R49 according to Example 4, by inductively coupled plasma emission spectrometry (ICP-OES) as described hereinabove, in terms of quantities of species extracted from the glass (expressed in µg/L), after having subjected said containers to a filling protocol as defined in chapter 660 of the USP (U.S. Pharmacopoeia) or in chapter 3.2.1. of the European Pharmacopoeia, and an ageing in an autoclave for 6 h in continuous at 121° C., filled with ultra-pure water.

TABLE 15

| Elementary species | | | Example 5 (quantities in µg/L) | | | |
|---|---|---|---|---|---|---|
| | R45 | R46 | R47 | R48 | R49 | Average |
| Si | 23 | 23 | 44 | 36 | 22 | 29 |
| Na | 116 | 117 | 93 | 110 | 130 | 113 |
| K | 15 | 19 | 9 | 15 | 20 | 15 |
| Ca | 82 | 85 | 19 | 42 | 75 | 60 |
| Mg | 2 | 2 | 1 | 2 | 1 | 2 |
| Al | 5 | 3 | 4 | 2 | 3 | 3 |
| Fe | 2 | 0 | 0 | 0 | 0 | 0 |
| B | 0 | 0 | 0 | 0 | 0 | 0 |
| Ba | 1 | 1 | 0 | 0 | 0 | 0 |
| Ti | 0 | 0 | 0 | 0 | 0 | 0 |
| Zn | 8 | 8 | 2 | 6 | 6 | 6 |
| Total extractables | 252 | 257 | 171 | 213 | 258 | 230 |

The results of Examples 1 to 5 hereinabove illustrate that containers according to the invention have quantities of elementary species released by the glass that are particularly small, in particular as regards silicon, sodium, aluminium, boron, barium and zinc. This indicates an excellent chemical resistance of the glass of the containers, and guarantees a storage duration of substances within these latter in optimum conditions.

The invention also relates, as such, to a raw container comprising a glass wall delimiting an accommodation cavity, said glass wall having an inner face located facing said accommodation cavity. Said semi-finished, raw container is intended to form a container according to the invention, as described hereinabove. Therefore, the glass wall of said raw container prefigures that of the container 1 according to the invention. According to the invention, said glass wall of the raw container is made of soda-lime glass, according to the definition already given hereinabove, and advantageously has the same physical-chemical properties in terms of atomic fractions and ratio of atomic fractions as those, described hereinabove, of the glass wall of the container 1 according to the invention.

According to the invention, the inner face of the glass wall of the raw container forms a glass surface that is devoid of sodium sulphate ($Na_2SO_4$) grains, which advantageously constitute a residue of dealkalization treatment of the glass in the vicinity of the surface of the inner face of the glass wall, preferably using ammonium sulphate (($NH_4)_2SO_4$). Said raw container is thus advantageously obtained from a container with a wall made of a typically Type III, soda-lime glass, preferably moulded glass, which has been subjected to a dealkalization treatment to obtain the above-described physical-chemical characteristics, and which has, due to this dealkalization treatment, sodium sulphate grains at the surface of the inner face of its glass wall. Said sodium sulphate grains thus form a powder residual deposit, which can be removed, by a suitable washing of the surface of the inner face of the glass wall, before the accommodation cavity of the container is finally filled with a substance, and in particular with a pharmaceutical or diagnostic substance.

In accordance with the invention, said sodium sulphate grains are shaped and arranged in a substantially uniform manner on the glass surface of the inner face, thus forming on said surface a bloom that is white (or whitish, slightly milky in appearance), translucent and substantially homogeneous, at least to the naked eye (i.e. from a macroscopic point of view) and under illumination using light in the range visible to the human eye. Typically, said sodium sulphate grains have a generally spherical shape. Said sodium sulphate grains advantageously have an average size between 50 nm and 1,500 nm. For example, said grains may be gathered into two populations, i.e. a population of small grains that have an average size advantageously between 50 nm and 200 nm, and a population of large grains that have an average size advantageously between 500 nm and 1,500 nm. Said sodium sulphate grains are advantageously distributed over the glass surface of the inner face with an average surface density from 0.1 grains/$\mu m^2$ to 30 grains/$\mu m^2$, and preferably from 0.1 grains/$\mu m^2$ to 25 grains/$\mu m^2$ (grains per square micrometer). For example, the grains may be gathered on the one hand into a population of small grains, as mentioned hereinabove, which are distributed over the glass surface of the inner face with an average surface density advantageously from 3 grains/$\mu m^2$ to 25 grains/$\mu m^2$, and on the other hand a population of large grains, as already mentioned hereinabove, which are distributed over the glass surface of the inner face with an average surface density advantageously from 0.13 grains/$\mu m^2$ to 4 grains/$\mu m^2$. These size and surface density characteristics may be observed, for example, with a scanning electron microscope (SEM).

Formed by such sodium sulphate grains uniformly distributed over the surface of the inner face, the white bloom is thus substantially uniform, therefore substantially free of more or less marked, opaque spots. Preferably, the outer face of the glass wall of the raw container, opposite to said inner face, forms a surface that is substantially devoid of sodium sulphate grains (with the possible exception of a few scattered grains). However, as an alternative, it remains conceivable that the surface of said outer face can also be provided with sodium sulphate grains, in which case these latter are shaped and arranged in a substantially uniform manner on the surface of the outer face, thus also forming a bloom that is white (or whitish, slightly milky in appearance), translucent and substantially homogeneous, at least to the naked eye (i.e. from a macroscopic point of view) and under illumination using light in the range visible to the human eye.

Said raw container is intended to undergo a washing of the surface of the inner face (and, as the case may be, of the outer face) of the glass wall in order to eliminate therefrom said bloom of sodium sulphate grains, before the accommodation cavity of the so-obtained container is finally filled with a substance, and in particular a pharmaceutical or diagnostic substance. Thus, the washing of the semi-finished, raw container makes it possible to eliminate the white bloom from the surface of the glass wall and to advantageously obtain the container 1 of the invention, as described hereinabove.

Thanks to such a characteristic of homogeneity, uniformity, of the bloom formed by the sodium sulphate grains, the glass wall of the raw container according to the invention may be easily and efficiently inspected, for potential glass defect, to the naked eye or using a conventional machine for automatic optical inspection, and that without it is thereby necessary to proceed to any post-treatment of the glass wall (such as, in particular, a washing, an elimination of the sulphate grains, from the surface of the glass wall) previously to such an inspection. The quality control of the container is thus particularly reliable, while being simpler and less expensive to implement. This ensures that the container is reliably controlled, making it particularly safe.

Particularly advantageously, but without being limited thereto, a raw container according to the invention can be obtained, in a simple and efficient manner, from a container (or primary container) of the Type Ill moulded soda-lime glass vial type, by subjecting the latter to a dealkalization treatment of the glass in the vicinity of the surface of the inner face of its glass wall by introduction into the accommodation cavity of the container, using an injection head located remote from the opening of the container and out of the latter, whereas said glass wall is at a temperature of about 350° C., and preferably between 350° C. and 800° C., still preferably between 350° C. and 700° C., of a liquid dose of ammonium sulphate ($NH_4)_2SO_4$ dissolved in ultra-pure water. Preferably, the concentration of ammonium sulphate in the liquid dose will be chosen close or just below the saturation concentration. The volume of said liquid dose may obviously vary according to the size, and in particular the nominal volume, of the considered container.

It results therefrom that the containers according to the invention are not only particularly effective in terms of chemical resistance, but are also particularly reliable, at a reasonable manufacturing cost.

POSSIBILITY OF INDUSTRIAL APPLICATION

The invention finds its application in the field of glass containers, and in particular for the packaging of pharmaceutical or diagnostic substances.

The invention claimed is:

1. A container (1) comprising a glass wall (2) delimiting an accommodation cavity (3) for a substance, said glass wall (2) having an inner face (4) located facing said accommodation cavity (3), said container (1) being characterized in that said wall (2) is made of soda-lime glass, said inner face (4) forming a bare glass surface intended to come into direct contact with said substance, said glass wall (2) having an atomic fraction of sodium, as measured by X-ray induced photoelectron spectrometry, that is lower than 4 at. % up to a depth of at least 200 nm from the surface of the inner face (4).

2. The container (1) according to claim 1, characterized in that said atomic fraction of sodium is lower than or equal to 3.5 at. % up to a depth of at least 200 nm from the surface of the inner face (4).

3. The container (1) according to claim 1, characterized in that said atomic fraction of sodium is lower than or equal to 3.5 at. % up to a depth of at least 100 nm from the surface of the inner face (4).

4. The container (1) according to claim 1, characterized in that said atomic fraction of sodium is lower than or equal to 2.4 at. % up to a depth of 30 nm from the surface of the inner face (4).

5. The container (1) according to claim 1, characterized in that said atomic fraction of sodium is lower than or equal to 2.0 at. % up to a depth of 15 nm from the surface of the inner face (4).

6. The container (1) according to claim 1, characterized in that said atomic fraction of sodium is lower than or equal to 1.5 at. % at a depth of 0 nm from the surface of the inner face (4).

7. The container (1) according to claim 1, characterized in that said atomic fraction of sodium is lower than or equal to 2.5 at. % up to a depth of at least 200 nm from the surface of the inner face (4), lower than or equal to 2.0 at. % up to a depth of at least 30 nm from the surface of the inner face (4), while being lower than or equal to 1.0 at. % at a depth of 0 nm from the surface of the inner face (4).

8. The container (1) according to claim 1, characterized in that said glass wall (2) has a ratio of an atomic fraction of sodium to an atomic fraction of silicon, measured by X-ray induced photoelectron spectrometry, that is lower than or equal to 0.130 up to a depth of at least 200 nm from the surface of the inner face (4).

9. The container (1) according to claim 1, characterized in that said glass wall (2) has a ratio of an atomic fraction of sodium to an atomic fraction of silicon, measured by X-ray induced photoelectron spectrometry, that is lower than or equal to 0.130 up to a depth of at least 100 nm from the surface of the inner face (4).

10. The container (1) according to claim 1, characterized in that said glass wall (2) has a ratio of an atomic fraction of sodium to an atomic fraction of silicon, measured by X-ray induced photoelectron spectrometry, that is lower than or equal to 0.080 up to a depth of at least 30 nm from the surface of the inner face (4).

11. The container (1) according to claim 1, characterized in that said glass wall (2) has a ratio of an atomic fraction of sodium to an atomic fraction of silicon, measured by X-ray induced photoelectron spectrometry, that is lower than or equal to 0.080 up to a depth of at least 15 nm from the surface of the inner face (4).

12. The container (1) according to claim 1, characterized in that said glass wall (2) has a ratio of an atomic fraction of sodium to an atomic fraction of silicon, measured by X-ray induced photoelectron spectrometry, that is lower than or equal to 0.050 at a depth of 0 nm from the surface of the inner face (4).

13. The container (1) according to claim 1, characterized in that said glass wall (2) has a ratio of an atomic fraction of calcium to an atomic fraction of silicon, measured by X-ray induced photoelectron spectrometry, that is lower than or equal to 0.240 up to a depth of at least 200 nm from the surface of the inner face (4).

14. The container (1) according to claim 1, characterized in that said glass wall has a ratio of an atomic fraction of calcium to an atomic fraction of silicon, measured by X-ray induced photoelectron spectrometry, that is lower than or equal to 0.230 up to a depth of at least 100 nm from the surface of the inner face (4).

15. The container (1) according to claim 1, characterized in that said glass wall has a ratio of an atomic fraction of calcium to an atomic fraction of silicon, measured by X-ray induced photoelectron spectrometry, that is lower than or equal to 0.210 up to a depth of at least 30 nm from the surface of the inner face (4).

16. The container (1) according to claim 1, characterized in that said glass wall (2) has a ratio of an atomic fraction of calcium to an atomic fraction of silicon, measured by X-ray induced photoelectron spectrometry, that is lower than or equal to 0.200 up to a depth of at least 15 nm from the surface of the inner face (4).

17. The container (1) according to claim 1, characterized in that said glass wall has a ratio of an atomic fraction of calcium to an atomic fraction of silicon, measured by X-ray induced photoelectron spectrometry, that is lower than or equal to 0.050 at a depth of 0 nm from the surface of the inner face (4).

18. The container (1) according to claim 1, characterized in that said glass wall (2) has a ratio of an atomic fraction of aluminium to an atomic fraction of silicon, measured by X-ray induced photoelectron spectrometry, that is lower than or equal to 0.040 up to a depth of at least 200 nm from the surface of the inner face (4).

19. The container (1) according to claim 1, characterized in that said glass wall (2) has a ratio of an atomic fraction of aluminium to an atomic fraction of silicon, measured by X-ray induced photoelectron spectrometry, that is lower than or equal to 0.040 up to a depth of at least 100 nm from the surface of the inner face (4).

20. The container (1) according to claim 1, characterized in that said glass wall (2) has a ratio of an atomic fraction of aluminium to an atomic fraction of silicon, measured by X-ray induced photoelectron spectrometry, that is lower than or equal to 0.050 up to a depth of at least 30 nm from the surface of the inner face (4).

21. The container (1) according to claim 1, characterized in that said glass wall (2) has a ratio of an atomic fraction of aluminium to an atomic fraction of silicon, measured by X-ray induced photoelectron spectrometry, that is lower than or equal to 0.050 up to a depth of at least 15 nm from the surface of the inner face (4).

22. The container (1) according to claim 1, characterized in that said glass wall (2) has a ratio of an atomic fraction of aluminium to an atomic fraction of silicon, measured by X-ray induced photoelectron spectrometry, that is lower than or equal to 0.040 at a depth of 0 nm from the surface of the inner face (4).

23. The container (1) according to claim 1, characterized in that it forms a vial or a bottle.

24. The container (1) according to claim 1, characterized in that it is made of moulded glass.

25. A raw container intended to form a container (1) according to claim 1, said raw container comprising said glass wall delimiting an accommodation cavity, said glass wall of said raw container having said inner face located facing said accommodation cavity, said glass wall being made of soda-lime glass, said inner face forming said glass surface provided with sodium sulphate grains shaped and arranged in a substantially uniform manner on said surface, thus forming a substantially homogeneous translucent white bloom, said raw container being intended to undergo a washing of the surface of the glass wall inner face of said raw container in order to eliminate said bloom.

26. The raw container according to claim 25, wherein said sodium sulphate grains have an average size between 50 nm and 1,500 nm.

27. The raw container according to claim 25, wherein said sodium sulphate grains are distributed over the glass surface of the inner face with an average surface density from 0.1 grains/$\mu m^2$ to 30 grains/$\mu m^2$.

\* \* \* \* \*